United States Patent
Rasale

(10) Patent No.: US 10,235,173 B2
(45) Date of Patent: Mar. 19, 2019

(54) PROGRAM CODE OPTIMIZATION FOR REDUCING BRANCH MISPREDICTIONS

(71) Applicant: Advanced Micro Devices, Inc., Sunnyvale, CA (US)

(72) Inventor: Anupama Rajesh Rasale, Bangalore (IN)

(73) Assignee: Advanced Micro Devices, Inc., Santa Clara, CA (US)

( * ) Notice: Subject to any disclaimer, the term of this patent is extended or adjusted under 35 U.S.C. 154(b) by 98 days.

(21) Appl. No.: 15/607,883

(22) Filed: May 30, 2017

(65) Prior Publication Data

US 2018/0349140 A1 Dec. 6, 2018

(51) Int. Cl.
  *G06F 8/41* (2018.01)
  *G06F 9/30* (2018.01)
  *G06F 9/38* (2018.01)

(52) U.S. Cl.
  CPC .......... *G06F 9/30058* (2013.01); *G06F 8/443* (2013.01); *G06F 8/445* (2013.01); *G06F 8/452* (2013.01); *G06F 9/3861* (2013.01); *G06F 9/3802* (2013.01); *G06F 9/3844* (2013.01)

(58) Field of Classification Search
  CPC ........... G06F 8/443; G06F 8/452; G06F 8/445
  USPC ........................................ 717/151, 152, 153
  See application file for complete search history.

(56) References Cited

U.S. PATENT DOCUMENTS

| | | |
|---|---|---|
| 5,850,553 A | 12/1998 | Schlansker et al. |
| 5,901,318 A | 5/1999 | Hsu |
| 6,871,343 B1 * | 3/2005 | Yoshikawa ......... G06F 9/30043 712/226 |
| 7,836,289 B2 | 11/2010 | Tani |
| 2005/0138480 A1 * | 6/2005 | Srinivasan ............ G06F 9/3838 714/38.1 |
| 2008/0010635 A1 * | 1/2008 | O'Brien ................ G06F 8/4441 717/160 |
| 2011/0314259 A1 * | 12/2011 | Ekanadham ........ G06F 9/30134 712/202 |
| 2014/0281439 A1 * | 9/2014 | Reddy ................. G06F 9/30058 712/239 |

(Continued)

OTHER PUBLICATIONS

Michael D. Smith, "Architectural Support for Compile-time Speculation" (Year: 1994).*

(Continued)

*Primary Examiner* — Phillip H Nguyen
(74) *Attorney, Agent, or Firm* — Meyertons Hood Kivlin Kowert and Goetzel PC; Rory D. Rankin

(57) ABSTRACT

Systems, apparatuses, and methods for implementing an IF2FOR transformation are disclosed. In one embodiment, a first group of instructions include an IF-statement and one or more control dependent instructions. The first group of instructions are transformed into a second group of instructions if the first group of instructions meet one or more criteria. In one embodiment, the criteria includes the (1) IF-statement being part of a loop and (2) the control dependent instructions not having any inter-loop iteration dependency. The second group of instructions are executable to (1) store results of the IF-statement condition for a first number of iterations and (2) execute the control dependent instructions for a second number of iterations when the IF-statement condition evaluates to true.

20 Claims, 9 Drawing Sheets

(56) References Cited

U.S. PATENT DOCUMENTS

2016/0378472 A1* 12/2016 Iyer .................... G06F 9/30029
  712/223
2017/0039072 A1* 2/2017 Gellerich .............. G06F 9/3806

OTHER PUBLICATIONS

Andrews, Jeff, "Branch and Loop Reorganization to Prevent Mispredicts", Intel.com, May 6, 2011, 14 pages, https://software.intel.com/en-us/articles/branch-and-loop-reorganization-to-prevent-mispredicts. [Retrieved May 8, 2018].

Enkovich, Ilya, "Vectorization for Intel® AVX-512", Intel.com, 2014, 22 pages, https://gcc.gnu.org/wiki/cauldron2015?action=AttachFile&do=get&target=Vectorization+for+Intel+AVX-512.pdf. [Retrieved May 8, 2018].

Fog, Agner, "3. The microarchitecture of Intel, AMD and VIA CPUs: An optimization guide for assembly programmers and compiler makers", Agner.org, Dec. 1, 2016, 226 pages.

Fog, Agner, "4. Instruction tables: Lists of instruction latencies, throughputs and micro-operation breakdowns for Intel, AMD and VIA CPUs", Agner.org, Dec. 1, 2016, pp. 1-156.

Fog, Agner, "4. Instruction tables: Lists of instruction latencies, throughputs and micro-operation breakdowns for Intel, AMD and VIA CPUs", Agner.org, Dec. 1, 2016, pp. 157-309.

Gandhi et al., "Reducing Branch Misprediction Penalty via Selective Branch Recovery", Proceedings of the 10th International Symposium on High Performance Computer Architecture, Feb. 14, 2004, 11 pages.

Gillespie, Matthew, "Intel® Itanium® Microarchitecture Support for .NET* and Java*", Intel.com, Sep. 20, 2011, 7 pages, https://software.intel.com/en-us/articles/intel-itaniumr-microarchitecture-support-for-net-and-java. [Retrieved May 8, 2018].

"Intel® 64 and IA-32 Architectures Software Developer's Manual" Intel.com, Sep. 2016, 2198 pages, vol. 2 (2A, 2B, 2C & 2D).

Sheikh et al., "Control-Flow Decoupling", The 45th Annual IEEE/ACM International Symposium on Microarchitecture, 2012, 40 pages, https://www.microarch.org/micro45/talks-posters/29-sheikh-presentation.pptx. [Retrieved May 8, 2018].

Sherwood et al., "Loop Termination Prediction", Proceedings of the 3rd International Symposium on High Performance Computing, Oct. 2000, 14 pages.

* cited by examiner

```
1   for (end = thesolver->coDim(), i = start2; i < end; i += incr2)
2   {
3     x = test[i];
4     if (x < -theeps)
5     {
6       x *= x / penalty_ptr[i];
7       x *= p[i];
8       if (x > best)
9       {
10        best = x;
11        selId = thesolver->id(i);
12      }
13    }
14  }
```

405

After IF2FOR Transformation

410

```
1   for( i = 0; i < end/64; i++ ) {
2     for ( j = 0; j < 64; j += incr2 )
3     {
4       x = test[i*64+j];
5       result = (x < -theeps);
6       Predicated_result |= result << j;
7   }
8   for ( pSI = 1st SET bit of Predicated_result; Predicated_result != 0;
          pSI = next SET bit of Predicated_result)
9     {
10        x = test[pSI*64+j];
11        x *= x / penalty_ptr[pSI*64+j];
12        x *= p[pSI*64+j];
13        if (x > best)
14        {
15          best = x;
16          selId = thesolver->id(pSI*64+j);
17        }
18      }
19  }
```

FIG. 4

PROGRAM CODE OPTIMIZATION FOR REDUCING BRANCH MISPREDICTIONS

BACKGROUND

Description of the Related Art

Processors, including central processing units (CPUs) and graphical processing units (GPUs), are utilized in various applications. A processor pipeline includes several stages for processing instructions, and instructions progress through the pipeline stages in order. To speed up the operation of the processor, it is desirable to have a full pipeline. One way of filling the pipeline is to fetch subsequent instructions while previous instructions are being processed. To be able to fetch ahead several instructions, a branch predictor can be used. A branch predictor predicts the direction of a branch instruction (i.e., taken or not-taken) and the branch target address before the branch instruction reaches the execution stage in the pipeline.

This is known as "pre-fetching" an instruction and "speculatively executing" the instruction. An instruction is speculatively executed because it is not known whether the prediction is correct until the branch instruction reaches the execution stage. Although pre-fetching and speculatively executing the instructions without knowing the actual direction of the branch instruction may result in speeding up the instruction processing, it may have the opposite effect and may result in stalling the pipeline if branch directions are mispredicted. If a branch misprediction occurs, the pipeline needs to be flushed and the instructions from the correct branch direction are fetched and executed. This may severely impact the performance of the system.

Branch predictors play a key role in speeding up the performance of pipelined superscalar processors. For conditional branches resulting from programming constructs (e.g., IF-THEN-ELSE, FOR, WHILE, DO_WHILE), a conditional branch predictor attempts to guess which way execution should proceed before the branch is actually executed. The fetch unit then fetches instructions for execution from the speculated path and these instructions are speculatively executed.

At the execution stage of the branch instruction, if it turns out that the speculation was incorrect, then the speculatively executed instructions are discarded, resulting in a pipeline flush. This scenario is called a branch misprediction or a branch miss. Instructions are then fetched from the correct path, which incurs a delay in instruction completion and progress of the application. The time (in cycles) taken to flush the pipeline, fetch the instructions from the correct path, and begin execution of these instructions is called the branch miss penalty. The branch miss penalty can be a significant inhibitor of performance in cases where the branch predictor generates a high number of mispredicted branches.

There are many different types of branches, including conditional, unconditional, call and return, indirect, etc. Conditional branches have only two possible fetch addresses, and the correct address gets resolved during the execution stage. Conditional branches can be broadly classified as forward pointing branches or backward branches. A forward pointing branch is a branch that has its target address higher than its own address. Forward pointing branches decide which path to take based on a condition. Forward pointing branches typically arise from control-flow program constructs such as if-then-else constructs.

Backward branches are loop-back branches ensuing from FOR, WHILE, or DO-WHILE loops. Backward branches are usually decisions on whether to execute an instruction sequence one more time. Studies on highly mispredicted benchmarks show that branch mispredictions often happen around control flow or condition-based branches, usually forward pointing branches, associated with control constructs like IF-THEN-ELSE. Backward branches are usually associated with loops (e.g., FOR loops, WHILE loops, DO-WHILE loops) and are taken a majority of the time resulting in a high prediction accuracy. For the highly mispredicted cases of control flow or condition-based branches, the prior art suffers from various inefficiencies and limitations.

BRIEF DESCRIPTION OF THE DRAWINGS

The advantages of the methods and mechanisms described herein may be better understood by referring to the following description in conjunction with the accompanying drawings, in which:

FIG. 4 illustrates a first group of instructions before IF2FOR transformation and a second group of instructions after IF2FOR transformation.

DETAILED DESCRIPTION OF EMBODIMENTS

Figure 1:
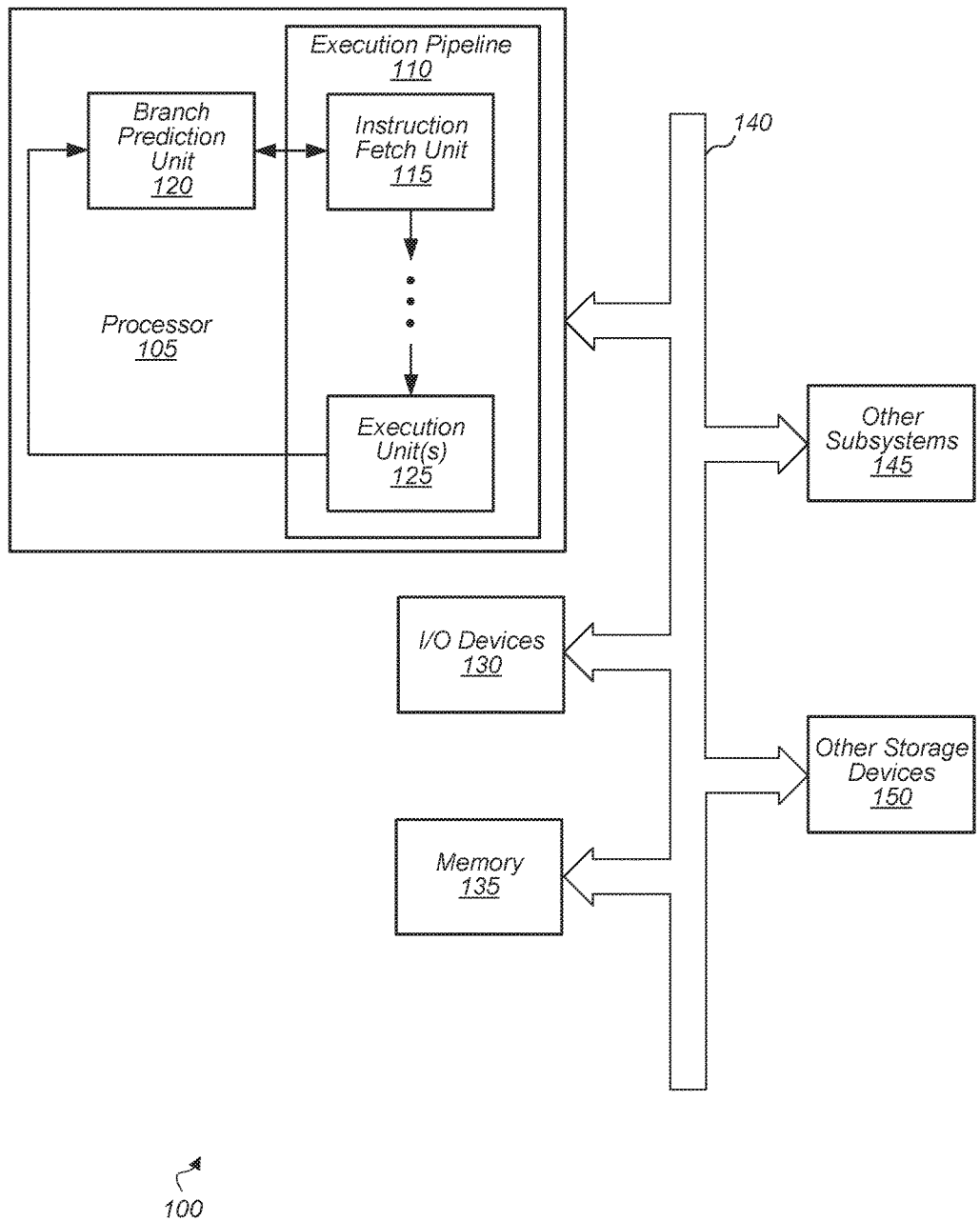
FIG. 1 is a block diagram of one embodiment of a computing system.

In the following description, numerous specific details are set forth to provide a thorough understanding of the methods and mechanisms presented herein. However, one having ordinary skill in the art should recognize that the various embodiments may be practiced without these specific details. In some instances, well-known structures, components, signals, computer program instructions, and techniques have not been shown in detail to avoid obscuring the approaches described herein. It will be appreciated that for simplicity and clarity of illustration, elements shown in the figures have not necessarily been drawn to scale. For example, the dimensions of some of the elements may be exaggerated relative to other elements.

Various systems, apparatuses, methods, and computer-readable mediums for implementing an IF2FOR transformation are disclosed. In one embodiment, a system includes at least a processor coupled to a memory. Program instructions stored on the memory are executable by the processor to receive a stream of instructions. In one embodiment, the system detects a first group of instructions, wherein the first group of instructions include a conditional branch instruction and one or more control dependent instructions. The control dependent instructions are instructions which will be executed if the conditional branch instruction is taken. The system is configured to determine whether the first group of instructions meets one or more criteria for transformation. If the first group of instructions meets the criteria for transformation, the system is configured to transform the first group of instructions into a second group of instructions. The second group of instructions are executable by a processor to store results of the conditional branch instruction for a first number of iterations and execute the control dependent instructions for a second number of iterations when the conditional branch is predicted as taken, wherein the second number is less than or equal to the first number.

In one embodiment, the criteria for performing the transformation includes the conditional branch instruction being a part of a loop and the control dependent instructions not having any inter iteration dependency on separate iterations of the loop. In one embodiment, the results of the conditional branch instruction for the first number of iterations are stored in a register, with a single bit stored in the register for each iteration of the first number of iterations. The control dependent instructions are not executed for iterations when the conditional branch instruction is predicted as not taken, as indicated by "0" bits stored in the register.

In one embodiment, the conditional branch instruction is an IF-statement, and the control dependent instructions are executed for the second number of iterations when a condition specified by the IF-statement evaluates to true. In one embodiment, the second group of instructions include a first FOR-loop to store results of the IF-statement condition for the first number of iterations. In this embodiment, the second group of instructions also include a second FOR-loop to execute the control dependent instructions for the second number of iterations when the IF-statement condition evaluates to true. The second FOR-loop includes one or more instructions for reading the results of the IF-statement condition to determine whether to execute the control dependent instructions.

Referring now to FIG. 1, a block diagram of one embodiment of a computing system 100 is shown. Computer system 100 includes a processor 105, input/output (I/O) devices 130, a memory 135, other storage devices 150, and various other subsystems 145, all interconnected via one or more buses 140. In various embodiments, computing system 100 can be a computer, laptop, mobile device, server or any of various other types of computing systems or devices. It is noted that the number and type of components of computing system 100 can vary from embodiment to embodiment. It is also noted that computing system 100 can include other components not shown in FIG. 1. Additionally, in other embodiments, computing system 100 can be structured in other ways than shown in FIG. 1.

Processor 105 is one embodiment of a processor that is configured to execute instructions. In the illustrated embodiment, processor 105 includes execution pipeline 110 and branch prediction unit 120. Execution pipeline 110 includes an instruction fetch unit 115 and one or more execution units 125. In some embodiments, branch prediction unit 120 can also be considered as being part of execution pipeline 110. In other embodiments, processor 105 can be configured differently than shown.

Processor 105 is representative of any number and type of processors. In one embodiment, processor 105 is a general-purpose processor such as a central processing unit (CPU). In some embodiments, processor 105 is a special-purpose processor such as an arithmetic processing unit (APU), digital signal processor (DSP), graphics processing unit (GPU), etc. In some embodiments, processor 105 is acceleration logic such as an application-specific integrated circuit (ASIC), a field-programmable gate array (FPGA), etc. In one embodiment, processor 105 is a multi-threaded superscalar processor. In one embodiment, processor 105 includes a plurality of multi-threaded execution cores (processing elements) that are configured to operate independently of one another.

Execution pipeline 110 is representative of circuitry that is configured to execute instructions (as used herein, the term "execute" broadly refers to performing various stages needed to initiate, perform, and commit an instruction). Execution pipeline 110 can, of course, include more units than shown in FIG. 1. For example, in one embodiment, execution pipeline 110 includes a decode unit configured to decode specified opcodes and operands of instructions. In one embodiment, execution pipeline 110 includes a rename unit configured to perform register renaming. In one embodiment, execution pipeline 110 includes an issue unit configured to provide instruction sources and data to execution units 125. In one embodiment, execution pipeline 110 includes a load store unit configured to facilitate performance of load/store instructions. In one embodiment, execution pipeline 110 includes a floating point unit configured to perform floating-point operations. In one embodiment, execution pipeline 110 includes a commit unit configured to manage retirement of instruction results. In short, execution pipeline 110 can include various suitable structures known in the art.

Instruction fetch unit (IFU) 115, in one embodiment, is configured to fetch instructions for execution in pipeline 110. In one embodiment, IFU 115 is configured to select a thread for execution from among a plurality of threads and then fetch instructions for that thread. In one embodiment, IFU 115 is configured to fetch an instruction by generating a fetch address that is supplied to an instruction cache to cause retrieval of that instruction. As used herein, a "fetch address" specifies a memory location that stores an instruction to be fetched. In some embodiments, a fetch address corresponds to a single instruction to be fetched. In other embodiments, a fetch address corresponds to a set of instructions to be fetched (e.g., a fetch address corresponding to an entire cache line). In one embodiment, IFU 115 is configured to translate a fetch address from a virtual address to a corresponding physical address using an instruction table lookaside buffer (ITLB). In various embodiments, IFU 115 generates a fetch address as a function of a program counter (PC), a predicted target address, or an address supplied in some other manner. In one embodiment, branch prediction unit 120 is configured to provide fetch addresses to IFU 115 to facilitate fetching instructions. In one embodiment, IFU 115 is configured to prefetch instructions before the instructions are actually required to be fetched.

Execution units 125, in one embodiment, are configured to perform instructions fetched by IFU 115. In one embodiment, an execution unit 125 is configured to perform (without limitation) arithmetic, logical, and/or shift instructions. For example, in one embodiment, execution units 125 include one or more arithmetic logic units (ALUs) configured to calculate results of such instructions. In various embodiments, execution units 125 support integer instructions and/or floating-point instructions. In one embodiment, execution units 125 are configured to perform load/store instructions. In various embodiments, execution units 125 perform other instructions defined within the instruction set architecture (ISA) for processor 105.

In one embodiment, one or more execution units 125 are configured to perform control transfer instructions such as branches, call/return instructions, or other types of instructions that cause the transfer of execution from a current fetch address to a nonsequential address. In one embodiment, upon performing a control transfer instruction, an execution unit 125 is configured to provide an indication of its outcome to branch prediction unit 120. In various embodiments, branch prediction unit 120 is configured to use the provided indication to predict the outcomes of future control transfer instructions. In some embodiments, the provided indication specifies whether the outcome of a control transfer instruction has been mispredicted.

In one embodiment, BPU 120 is configured to determine fetch addresses by predicting directions and target addresses of control transfer instructions. In some embodiments, BPU 120 is configured to predict instructions based on information received from IFU 115, such as a program counter. In some embodiments, IFU 115 is configured to identify whether the program counter is associated with a branch instruction, by partially decoding (or predecoding) a fetched instruction. In one embodiment, BPU 120 is configured to determine fetch addresses based on the outcomes of control transfer instructions previously performed by execution units 125. In various embodiments, BPU 120 includes structures to track prior branch history, maintain weight tables that reflect relative weights or strengths of predictions, and/or store predicted fetch addresses.

In one embodiment, processor 105 is configured to execute instructions of a particular ISA. In one embodiment, the processor 105 is configured to execute the main control software of system 100, such as an operating system. Generally, software executed by processor 105 during use can control the other components of system 100 to realize the desired functionality of system 100. Processor 105 can also execute other software, such as application programs.

Figure 2:
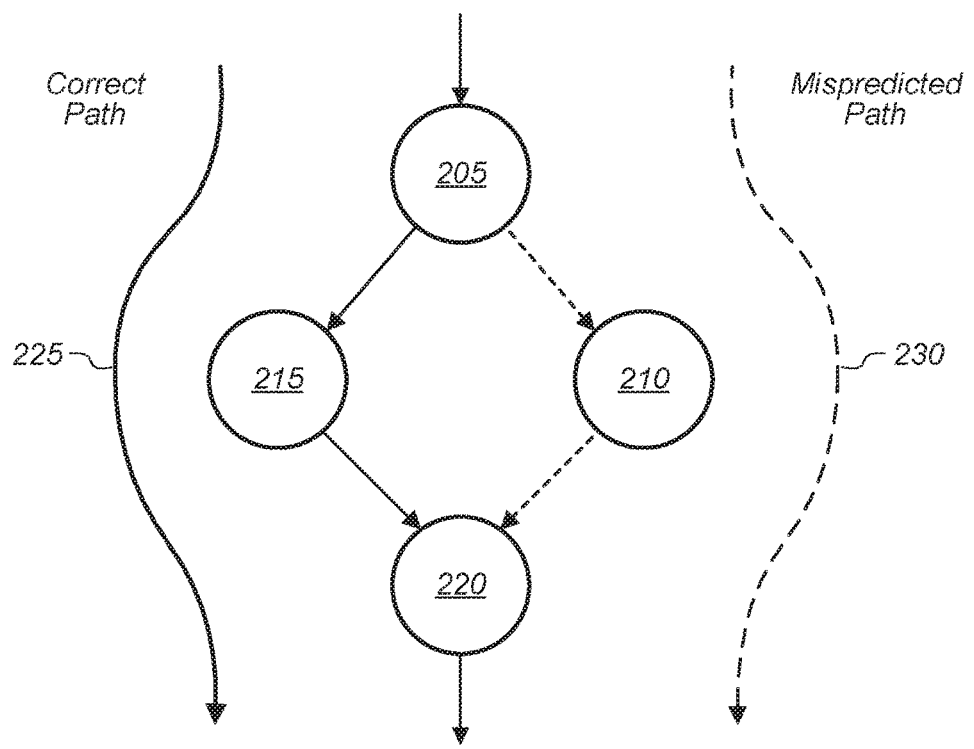
FIG. 2 is a diagram of one embodiment of code with a branch.

Turning now to FIG. 2, a diagram of one embodiment of code with a branch. The code begins with instruction 205, which is a control transfer instruction. A branch predictor (e.g., BPU 120 of FIG. 2) is configured to generate a prediction of the next instruction. If the branch predictor predicts, incorrectly, that instruction 210 is the target of instruction 205, then the processor will proceed along the mispredicted path 230. However, if the branch predicts, correctly, that instruction 215 is the target of instruction 205, then the processor will proceed on the correct path 225 to instruction 220. A common goal of branch predictors is to minimize the branch misprediction rate to decrease the number of pipeline flushes and processor stalls. A decrease in the number of pipeline flushes and processor stalls results in an increase in performance of the processor.

Branch prediction is a technique used by processors to increase performance. By making a prediction about which branch the code will take, the processor can execute the branch in advance. The accuracy of the branch predictor can have a major impact on the performance of the processor. For each misprediction of a branch target, the processor discards the output of the branch and any subsequent instructions which were speculatively fetched and executed. If the misprediction rate of the branch predictor is too high, then this can reduce performance of the processor to unacceptably low levels. One way to improve the accuracy of the branch predictor is to convert branches that are difficult for the predictor to accurately predict the target into instructions which do not include branches. An IF2FOR transformation is one example of a technique for converting a branch (e.g., if statement) into a FOR-loop, which helps to reduce the misprediction rate of the branch predictor.

Figure 3:
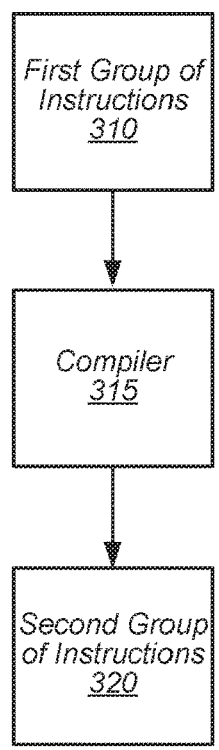
FIG. 3 is a block diagram of one embodiment of a compiler.

Referring now to FIG. 3, a block diagram of one embodiment of a compiler 315 is shown. Compiler 315 can execute on any type of computing system (e.g., system 100 of FIG. 1) which includes one or more processors coupled to one or more memory devices. Compiler 315 is representative of any type of software tool that is able to optimize and/or compile software instructions. In one embodiment, compiler 315 is configured to transform first group of instructions 310 into second group of instructions 320. First group of instructions 310 can include any number of IF-statements that are part of a loop. In response to detecting a given IF-statement within a loop, compiler 315 is configured to determine if the given IF-statement meets one or more criteria for undergoing an IF2FOR transformation. If the given IF-statement meets the criteria for undergoing an IF2FOR transformation, then compiler 315 converts the given IF-statement into a first FOR-loop which records the results of the given IF-statement condition for a given number of iterations. Compiler 315 then creates a second FOR-loop to execute the control dependent instructions of the given IF-statement only for those iterations when the given IF-statement condition evaluates to true. The first and second FOR-loops are then included in the second group of instructions 320.

It is noted that compiler 315 can also perform additional transformations on the first group of instructions 310. For example, as is understood by those skilled in the art, compiler 315 can convert instructions in a high-level software language into an executable binary. Additionally, in some embodiments, compiler 315 can convert instructions into an intermediate representation which can then be further processed by another compiler or other software tool. In various embodiments, compiler 315 is configured to perform the transformations prior to runtime. In other embodiments, compiler 315 is configured to perform the transformations at runtime. For example, the compiler 315 may be configured to transform an intermediate representation (e.g., bytecode) to a final representation at runtime. These and other embodiments are possible and are contemplated.

Turning now to FIG. 4, examples of a first group of instructions 405 before IF2FOR transformation and a second group of instructions 410 after IF2FOR transformation are shown. The first group of instructions 405 illustrate a candidate loop which can be optimized by converting an IF-statement into a FOR-loop. The IF-statement "if (x<theeps)" on line 4 of instructions 405 is a candidate for IF2FOR transformation. The control dependent instructions for this IF statement are shown in lines 6-11 of instructions 405. As used herein, the term "control dependent instructions" refers to instructions that are executed conditionally based on a given condition.

In one embodiment, the first group of instructions 405 are converted by a compiler (e.g., compiler 310 of FIG. 3) into the second group of instructions 410. The first group of instructions 405 are transformed into the second group of instructions 410 to reduce the possibility of branch mispredictions when the code is executed. Although the second group of instructions 410 are not shown as machine code instructions, it should be understood that the compiler can convert the first group of instructions 405 into machine code that is executable by a processor. The second group of instructions 410 are representative of any type of instructions or code which can be generated by a compiler.

The second group of instructions 410 include a new FOR-loop on line 2 which was not included in the first group of instructions 405. The variable "result" stores the value of the original IF-statement condition "x<-theeps" for 64 iterations of the FOR-loop. The register "Predicated_result" stores a bit vector, with each bit of the register storing the value of the condition "x<-theeps" for a corresponding iteration of the loop. It should be understood that the use of a FOR-loop with 64 iterations is merely indicative of one type of embodiment when the register "Predicated_result" has a size of 64 bits. In other embodiments, the FOR-loop can execute for other numbers of iterations and the values can be stored in a registers of other sizes besides 64 bits.

The second FOR-loop introduced into second group of instructions 410 as part of the IF2FOR transformation is shown on line 8. For the FOR-loop on line 8, only the iterations for which the IF-statement condition "(x<theeps)" is true will be executed. For example, the register "Predicated_result" stores 64 bits indicating the status of the condition "(x<theeps)" for 64 different iterations. If in one scenario, the register "Predicated_result" only includes 10 separate "1" bits, then the FOR-loop on line 8 will only be executed 10 times.

Figure 5:
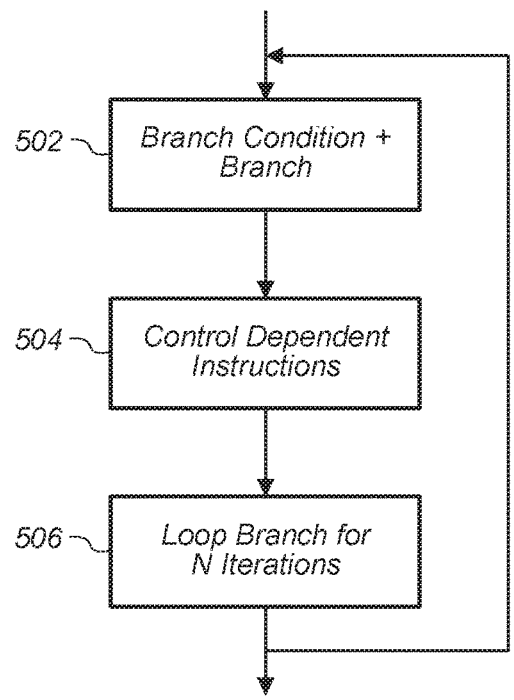
FIG. 5 is a block diagram of the criteria for performing an IF2FOR transformation.

Referring now to FIG. 5, a block diagram of the criteria for performing an IF2FOR transformation is shown. When analyzing source code instructions, a compiler (e.g., compiler 315 of FIG. 3) can search for opportunities for performing IF2FOR transformations. In one embodiment, the compiler looks for a branch condition 502. Also, the compiler determines if the control dependent instructions 504 of the branch condition 502 have any inter iteration dependences. If the control dependent instructions 504 do not have any inter iteration dependences, then this section of code is a candidate for the IF2FOR transformation. Finally, the compiler determines if the code has a loop branch 506 for N iterations, wherein the value of N can vary from embodiment to embodiment. If the code meets these three criteria, then the compiler can perform an IF2FOR transformation on this section of code. By performing the IF2FOR transformation, the resulting transformed code will have fewer branch mispredictions, resulting in a more efficient execution of the code.

Figure 6:
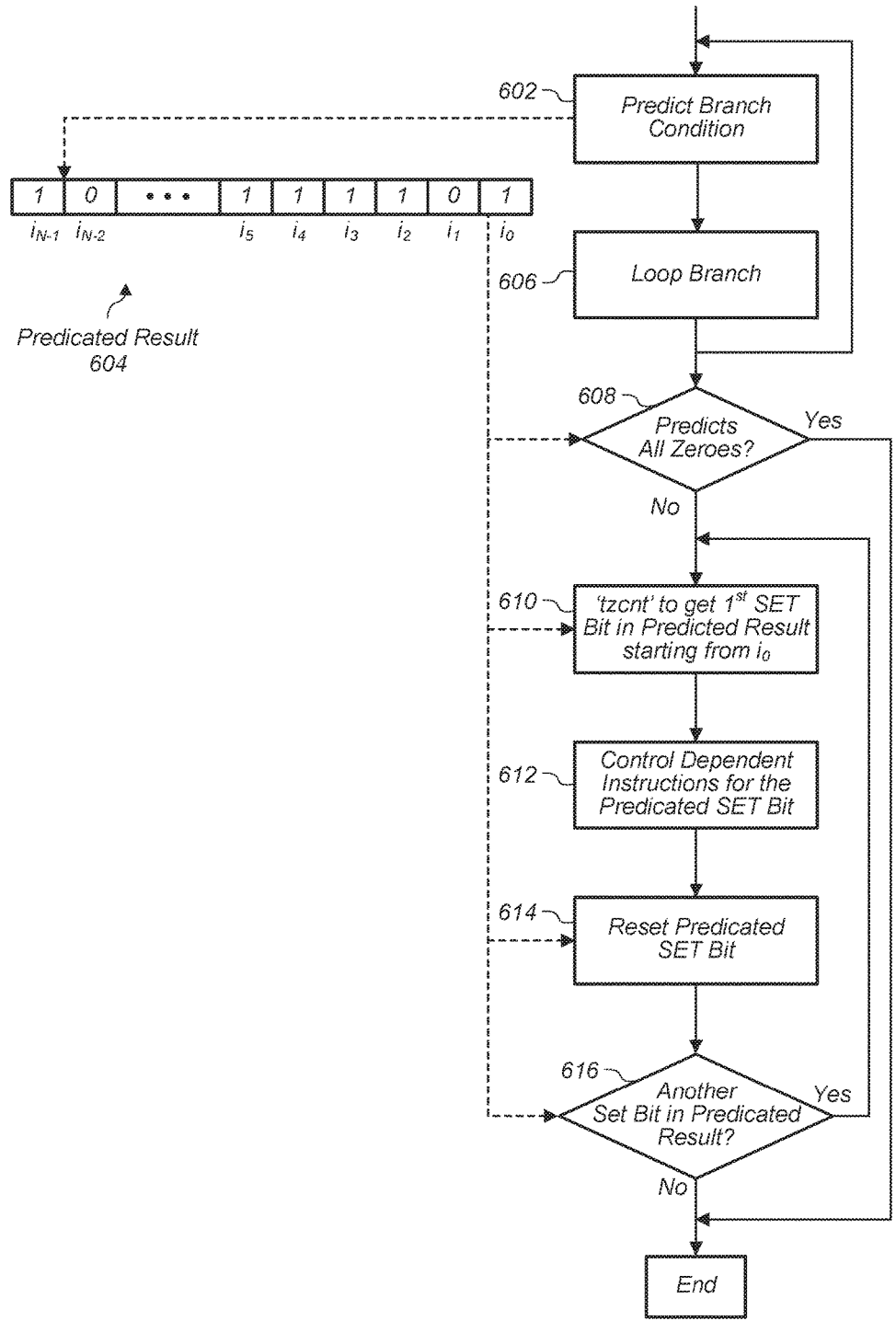
FIG. 6 is a block diagram of one embodiment of an IF2FOR transformation.

Turning now to FIG. 6, a block diagram of one embodiment of an IF2FOR transformation is shown. First, the branch condition is predicted for multiple iterations in block 602. In one embodiment, each branch condition prediction is generated during a given iteration of a first FOR-loop, with each branch condition prediction being stored as a single bit in predicated result 604. In one embodiment, the bits of predicated result 604 are stored in a register. In one embodiment, a "1" bit indicates that the branch condition is predicted as taken and a "0" bit indicates that the branch condition is predicted as not taken. In another embodiment, these designations can be reversed.

Next, a second loop branch 606 is executed to process the results of the branch condition prediction stored as predicated result 604. If the predicated result 604 stores all zeroes (conditional block 608, "yes" leg), then the control dependent instructions are not executed and the loop terminates. If the predicated result 604 does not store all zeroes (conditional block 608, "no" leg), then the first set bit is retrieved from predicated result 604 starting from $i_0$ (block 610). In one embodiment, the instruction 'tzent' is utilized to retrieve the first set bit from predicated result 604 starting from $i_0$. In other embodiments, other instructions can be utilized to retrieve the first set bit from predicated result 604 starting from $i_0$. Then, the control dependent instructions are executed in block 612 for the predicated set bit. Next, in block 614 the predicated set bit is reset. Then, the predicated result is tested in conditional block 616 and the loop returns to block 610 if there is another set bit in predicated result 604. Otherwise, the loop will end if there are no more set bits in predicated result 604.

Figure 7:
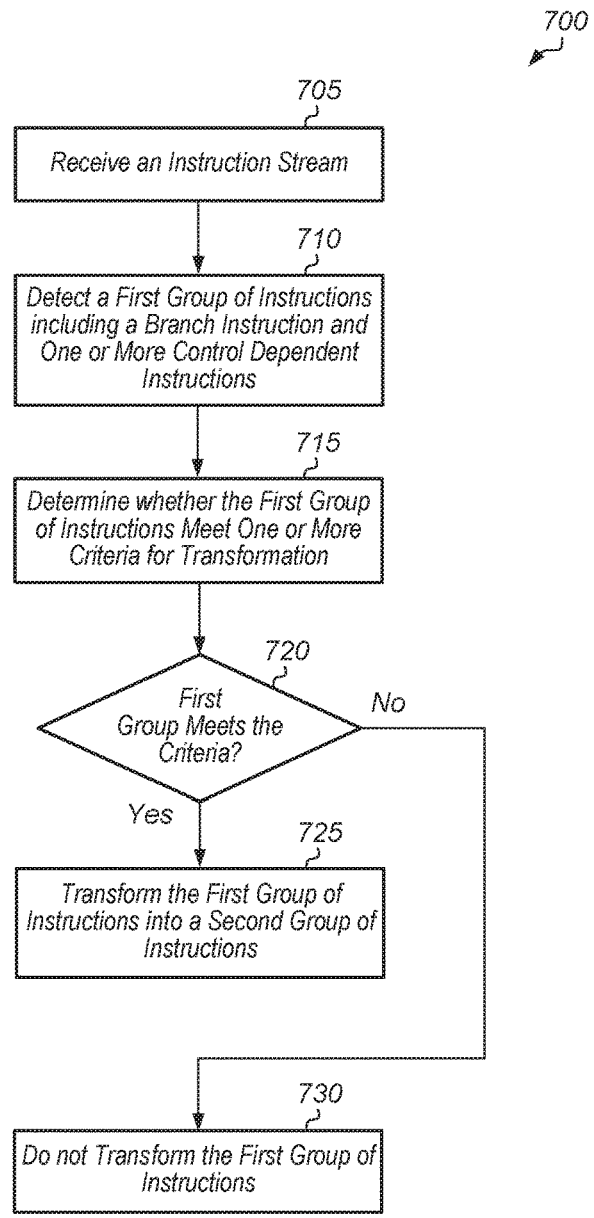
FIG. 7 is a generalized flow diagram illustrating one embodiment of a method for transforming instructions to reduce branch mispredictions.
Figure 8:
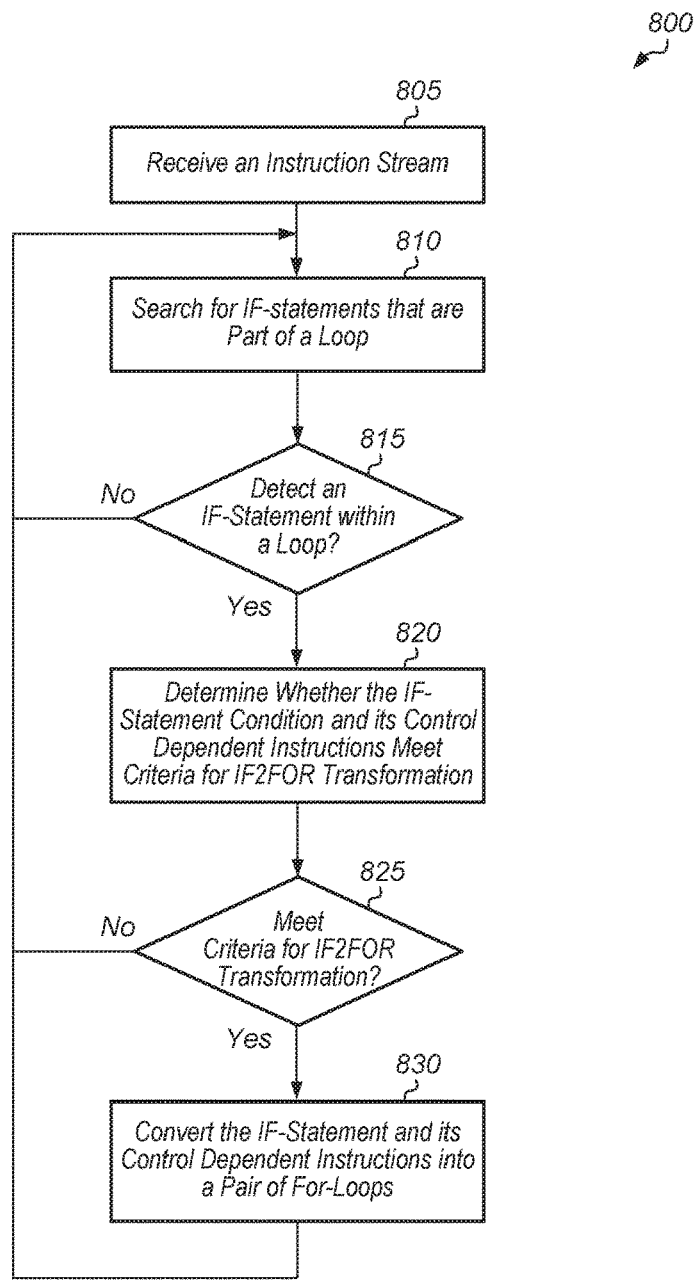
FIG. 8 is a generalized flow diagram illustrating one embodiment of a method for implementing an IF2FOR transformation.
Figure 9:
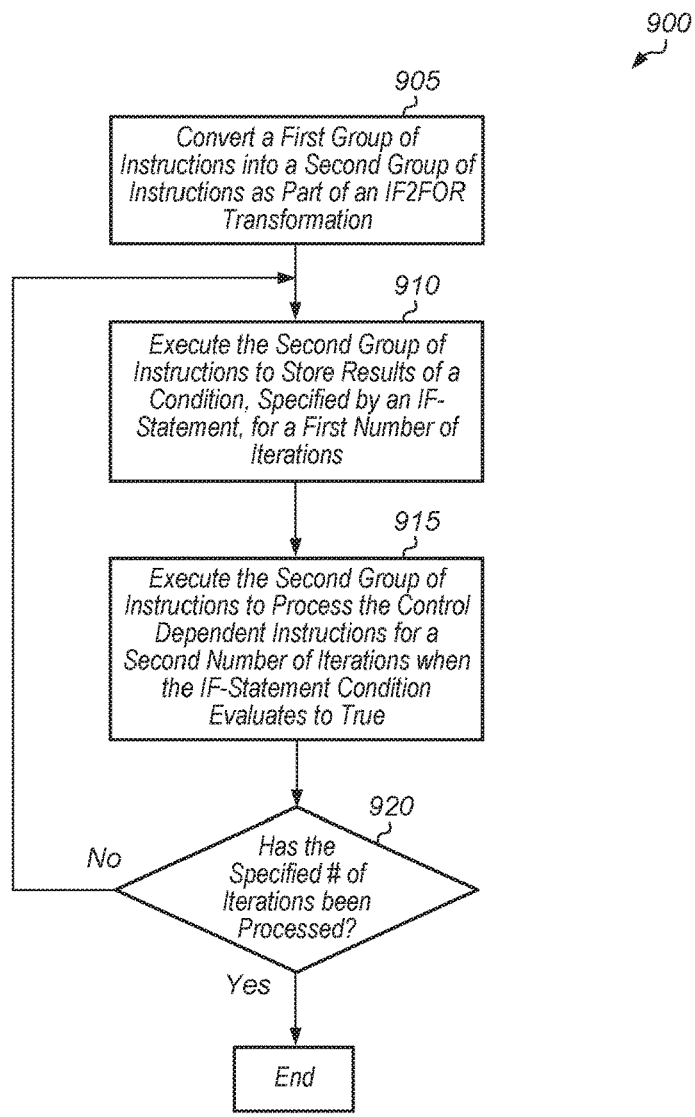
FIG. 9 is a generalized flow diagram illustrating one embodiment of a method for implementing a group of instructions generated as part of an IF2FOR transformation.

Referring now to FIG. 7, one embodiment of a method 700 for transforming instructions to reduce branch mispredictions is shown. For purposes of discussion, the steps in this embodiment and those of FIGS. 8-9 are shown in sequential order. However, it is noted that in various embodiments of the described methods, one or more of the elements described are performed concurrently, in a different order than shown, or are omitted entirely. Other additional elements are also performed as desired. Any of the various systems, apparatuses, or computing devices described herein are configured to implement method 700.

A compiler receives an instruction stream (block 705). The compiler detects a first group of instructions including a branch instruction and one or more control dependent instructions (block 710). In one embodiment, the branch instruction is an IF-statement. In other embodiments, the branch instruction can be other types of branches. Next, the compiler determines whether the first group of instructions meet one or more criteria for transformation (block 715). In one embodiment, the criteria for transformation include the branch instruction being part of a loop and the branch instruction not having any inter iteration dependency on the control dependent instructions. In other embodiments, the criteria can include other conditions.

If the first group of instructions meet the one or more criteria for transformation (conditional block 720, "yes" leg), then the compiler transforms the first groups of instructions into a second group of instructions (block 725). In one embodiment, the second group of instructions include a first FOR-loop replacing the branch instruction to determine when the branch instruction evaluates to taken for a first number of iterations and a second FOR-loop which executes the control dependent instructions for each iteration when the branch instruction evaluates to taken. If the first group of instructions does not meet the one or more criteria for transformation (conditional block 720, "no" leg), then the compiler does not transform the first group of instructions (block 730). After blocks 725 and 730, method 700 ends.

Turning now to FIG. 8, one embodiment of a method 800 for implementing an IF2FOR transformation is shown. A compiler receives an instruction stream (block 805). The compiler searches for IF-statements that are part of a loop (block 810). If the compiler detects an IF-statement within a loop (conditional block 815, "yes" leg), then the compiler determines whether the IF-statement condition and its control dependent instructions meet criteria for IF2FOR transformation (block 820). In one embodiment, the criteria includes the control dependent instructions not having any inter iteration dependencies. In this embodiment, the control dependent instructions are allowed to have intra iteration dependencies. In other embodiments, the criteria can differ. If the compiler does not detect an IF-statement within a loop (conditional block 815, "no" leg), then method 800 returns to block 810.

If the IF-statement condition and corresponding control dependent instructions meet the criteria for IF2FOR transformation (conditional block 825, "yes" leg), then the compiler converts the IF-statement and its control dependent instructions into a pair of For-Loops (block 830). The first FOR-LOOP iterates over the IF-Statement condition for a given number of iterations and stores the results of the IF-Statement condition for the given number of iterations. The second FOR-Loop traverses through the results of the IF-Statement condition and executes the control dependent instructions only for those iterations when the IF-Statement condition evaluates to true. After block 830, method 800 returns to block 810. If the IF-Statement condition and corresponding control dependent instructions do not meet the criteria for IF2FOR transformation (conditional block 825, "no" leg), then method 800 returns to block 810. Otherwise, if all of the IF-Statements in loops in the instruction stream have already been located and analyzed, then method 800 ends.

Referring now to FIG. 9, one embodiment of a method 900 for implementing a group of instructions generated as part of an IF2FOR transformation is shown. A first group of instructions are converted as part of an IF2FOR transformation into a second group of instructions (block 905). It is assumed for the purposes of this discussion that the first group of instructions are part of a first loop which includes an IF-Statement and one or more control dependent instructions.

Next, the second group of instructions are executed by a processor to store results of a condition, specified by an IF-Statement, for a first number of iterations (block 910). In one embodiment, the second group of instructions include a second loop for evaluating the IF-Statement condition for the first number of iterations. In one embodiment, the first number is equal to the bit size of the processor's registers. For example, if the processor's registers are 64-bit registers, then in this embodiment, the first number is equal to 64. In other embodiments, the first number can be other values.

Then, the second group of instructions are executed by a processor to process the control dependent instructions for a second number of iterations when the IF-Statement condition evaluates to true, wherein the second number is less than or equal to the first number (block 915). In one embodiment, the second group of instructions includes a third loop for executing the control dependent instructions for the second number of iterations. Next, if the IF-Statement condition has been evaluated for a total number of iterations specified by the first group of instructions (conditional block 920, "yes" leg), then method 900 ends. Otherwise, if the IF-Statement has not been evaluated for the total number of iterations specified by the first group of instructions (conditional block 920, "no" leg), then method 900 returns to block 910.

In various embodiments, program instructions of a software application are used to implement the methods and/or mechanisms previously described. The program instructions describe the behavior of hardware in a high-level programming language, such as C. Alternatively, a hardware design language (HDL) is used, such as Verilog. The program instructions are stored on a non-transitory computer readable storage medium. Numerous types of storage media are available. The storage medium is accessible by a computing system during use to provide the program instructions and accompanying data to the computing system for program execution. The computing system includes at least one or more memories and one or more processors configured to execute program instructions.

It should be emphasized that the above-described embodiments are only non-limiting examples of implementations. Numerous variations and modifications will become apparent to those skilled in the art once the above disclosure is fully appreciated. It is intended that the following claims be interpreted to embrace all such variations and modifications.

What is claimed is:

1. A system comprising:
a memory; and
a processor coupled to the memory;
wherein the program instructions stored on the memory are executable by the processor to:
receive an instruction stream;
detect, in the instruction stream, a first group of instructions comprising a conditional branch instruction and one or more control dependent instructions;
transform the first group of instructions into a second group of instructions responsive to determining that the first group of instructions meets one or more criteria, wherein the second group of instructions are executable by a processor to:
store results of the conditional branch instruction for a first number of iterations; and
execute the control dependent instructions for a second number of iterations when the conditional branch is predicted as taken, wherein the second number is less than or equal to the first number.

2. The system as recited in claim 1, wherein:
the conditional branch instruction is an IF-statement; and
the control dependent instructions are executed for the second number of iterations when a condition specified by the IF-statement evaluates to true.

3. The system as recited in claim 2, wherein the second group of instructions comprise a first FOR-loop to store results of the IF-statement condition for the first number of iterations.

4. The system as recited in claim 3, wherein the second group of instructions comprise a second FOR-loop to execute the control dependent instructions for the second number of iterations when the IF-statement condition evaluates to true.

5. The system as recited in claim 4, wherein the second FOR-loop comprises one or more instructions for reading the results of the IF-statement condition to determine whether to execute the control dependent instructions.

6. The system as recited in claim 1, wherein the criteria comprises:
the conditional branch instruction is part of a loop; and
the control dependent instructions do not have any inter iteration dependency on separate iterations of the loop.

7. The system as recited in claim 1, wherein:
results of the conditional branch instruction for the first number of iterations are stored in a register; and
the control dependent instructions are not executed for iterations when the conditional branch instruction is predicted as not taken.

8. A method for use in a computing device, the method comprising:
receiving an instruction stream;
detecting, in the instruction stream, a first group of instructions comprising a conditional branch instruction and one or more control dependent instructions;
transforming the first group of instructions into a second group of instructions responsive to determining that the first group of instructions meets one or more criteria, wherein the second group of instructions are executable by a processor to:
store results of the conditional branch instruction for a first number of iterations; and
execute the control dependent instructions for a second number of iterations when the conditional branch is predicted as taken, wherein the second number is less than or equal to the first number.

9. The method as recited in claim 8, wherein:
the conditional branch instruction is an IF-statement; and
the control dependent instructions are executed for the second number of iterations when a condition specified by the IF-statement evaluates to true.

10. The method as recited in claim 9, wherein the second group of instructions comprise a first FOR-loop to store results of the IF-statement condition for the first number of iterations.

11. The method as recited in claim 10, wherein the second group of instructions comprise a second FOR-loop to execute the control dependent instructions for the second number of iterations when the IF-statement condition evaluates to true.

12. The method as recited in claim 11, wherein the second FOR-loop comprises one or more instructions for reading the results of the IF-statement condition to determine whether to execute the control dependent instructions.

13. The method as recited in claim 8, wherein the criteria comprises:
the conditional branch instruction is part of a loop; and
the control dependent instructions do not have any inter iteration dependency on separate iterations of the loop.

14. The method as recited in claim 8, wherein:
results of the conditional branch instruction for the first number of iterations are stored in a register; and
the control dependent instructions are not executed for iterations when the conditional branch instruction is predicted as not taken.

15. A non-transitory computer readable storage medium storing program instructions, wherein the program instructions are executable by a processor to:
receive an instruction stream;
detect, in the instruction stream, a first group of instructions comprising a conditional branch instruction and one or more control dependent instructions;
transform the first group of instructions into a second group of instructions responsive to determining that the first group of instructions meets one or more criteria, wherein the second group of instructions are executable to:
store results of the conditional branch instruction for a first number of iterations; and
execute the control dependent instructions for a second number of iterations when the conditional branch is predicted as taken, wherein the second number is less than or equal to the first number.

16. The non-transitory computer readable storage medium as recited in claim 15, wherein:
the conditional branch instruction is an IF-statement; and
the control dependent instructions are executed for the second number of iterations when a condition specified by the IF-statement evaluates to true.

17. The non-transitory computer readable storage medium as recited in claim 16, wherein the second group of instructions comprise a first FOR-loop to store results of the IF-statement condition for the first number of iterations.

18. The non-transitory computer readable storage medium as recited in claim 17, wherein the second group of instructions comprise a second FOR-loop to execute the control dependent instructions for the second number of iterations when the IF-statement condition evaluates to true.

19. The non-transitory computer readable storage medium as recited in claim 18, wherein the second FOR-loop comprises one or more instructions for reading the results of the IF-statement condition to determine whether to execute the control dependent instructions.

20. The non-transitory computer readable storage medium as recited in claim 15, wherein the criteria comprises:
the conditional branch instruction is part of a loop; and
the control dependent instructions do not have any inter iteration dependency on separate iterations of the loop.

* * * * *